United States Patent
Hingorani et al.

(12) 
(10) Patent No.: US 6,276,109 B1
(45) Date of Patent: Aug. 21, 2001

(54) MOTOR VEHICLE TRIM PANEL ASSEMBLY AND METHOD

(75) Inventors: Arun G. Hingorani, Sterling Heights, MI (US); Louis Seitz, Cortland, OH (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/466,646

(22) Filed: Dec. 20, 1999

(51) Int. Cl.$^7$ .................................................. E04C 2/38
(52) U.S. Cl. ................. 52/716.5; 52/716.6; 52/716.7; 52/716.1; 52/718.04
(58) Field of Search .................. 52/716.1, 716.5, 52/716.6, 716.7, 718.01, 718.04, 718.05, 745.02; 296/29

(56) References Cited

U.S. PATENT DOCUMENTS

| | | | | |
|---|---|---|---|---|
| 2,084,717 | * | 6/1937 | Wiley | 52/716 |
| 3,153,468 | * | 10/1964 | Sweeney | 52/716 |
| 3,310,929 | * | 3/1967 | Garvey | 52/716 |
| 3,680,903 | * | 8/1972 | Hulten | 293/71 R |
| 3,841,044 | * | 10/1974 | Brown et al. | 52/716 |
| 3,842,565 | * | 10/1974 | Brown et al. | 52/716 |
| 3,938,842 | * | 2/1976 | Ruhl | 293/71 |
| 4,011,635 | * | 3/1977 | Meyer | 24/73 |
| 4,039,215 | * | 8/1977 | Minhinnick | 293/71 |
| 4,268,079 | * | 5/1981 | Nomura et al. | 293/120 |
| 4,321,780 | * | 3/1982 | Hooper et al. | 52/506 |
| 4,388,355 | * | 6/1983 | Ikemizu | 428/31 |
| 4,393,560 | * | 7/1983 | Kato | 24/295 |
| 4,707,008 | * | 11/1987 | Falco | 293/128 |
| 5,195,793 | * | 3/1993 | Maki | 293/155 |
| 5,275,455 | * | 1/1994 | Harney et al. | 296/1.1 |
| 5,288,530 | * | 2/1994 | Maki | 428/31 |
| 5,353,571 | * | 10/1994 | Berdan et al. | 52/716.5 |
| 5,639,522 | * | 6/1997 | Maki et al. | 428/31 |
| 5,660,897 | * | 8/1997 | Maki | 428/31 |
| 5,697,644 | * | 12/1997 | Logan et al. | 280/848 |
| 5,736,215 | * | 4/1998 | Buchholz et al. | 428/99 |

\* cited by examiner

*Primary Examiner*—Carl D. Friedman
*Assistant Examiner*—Phi Dieu Tran A
(74) *Attorney, Agent, or Firm*—Charles E. Leahy

(57) ABSTRACT

A motor vehicle trim panel assembly and method including a molded plastic trim panel having a facia portion, an integral skirt portion, a plurality of flat cantilever platforms on an inside surface of the facia portion, and a plurality of pairs of raised bosses on the inside surface of the facia portion. Each platform has a pair of side panels attached thereto by integral "living" hinges. A push-in fastener is supported in a slot in each platform. The side panels are folded down and snapped behind the raised bosses which retain the side panels in active positions defining struts between the platform and the inside surface of the facia portion. Force applied to an outside surface of the facia portion thrusts the push-in fastener into a socket in a vehicle body panel to secure the facia portion without the push-in fasteners being externally visible. The struts react to the facia portion a fraction of the thrust applied to the push-in fastener to prevent flexure of the platform. Because each platform is integral with the facia portion along only one edge of the platform, the plastic trim panel can be extracted from its mold without resort to sliding cores.

5 Claims, 2 Drawing Sheets

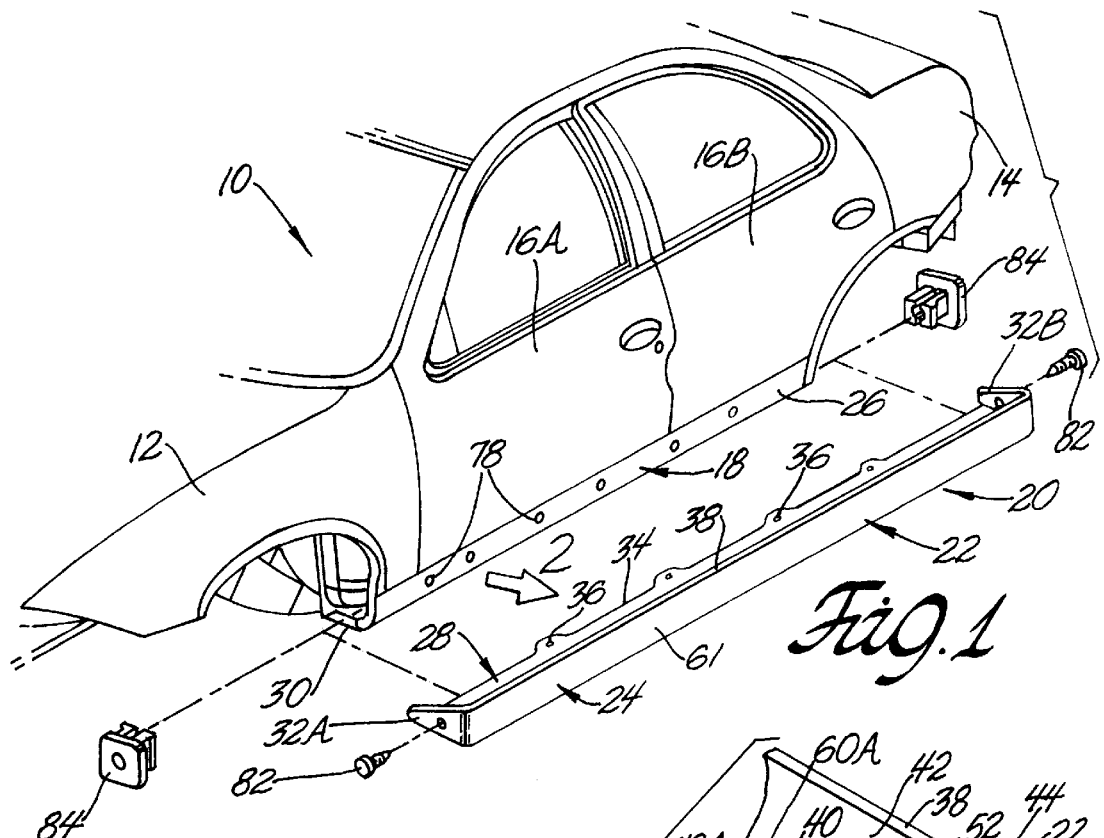
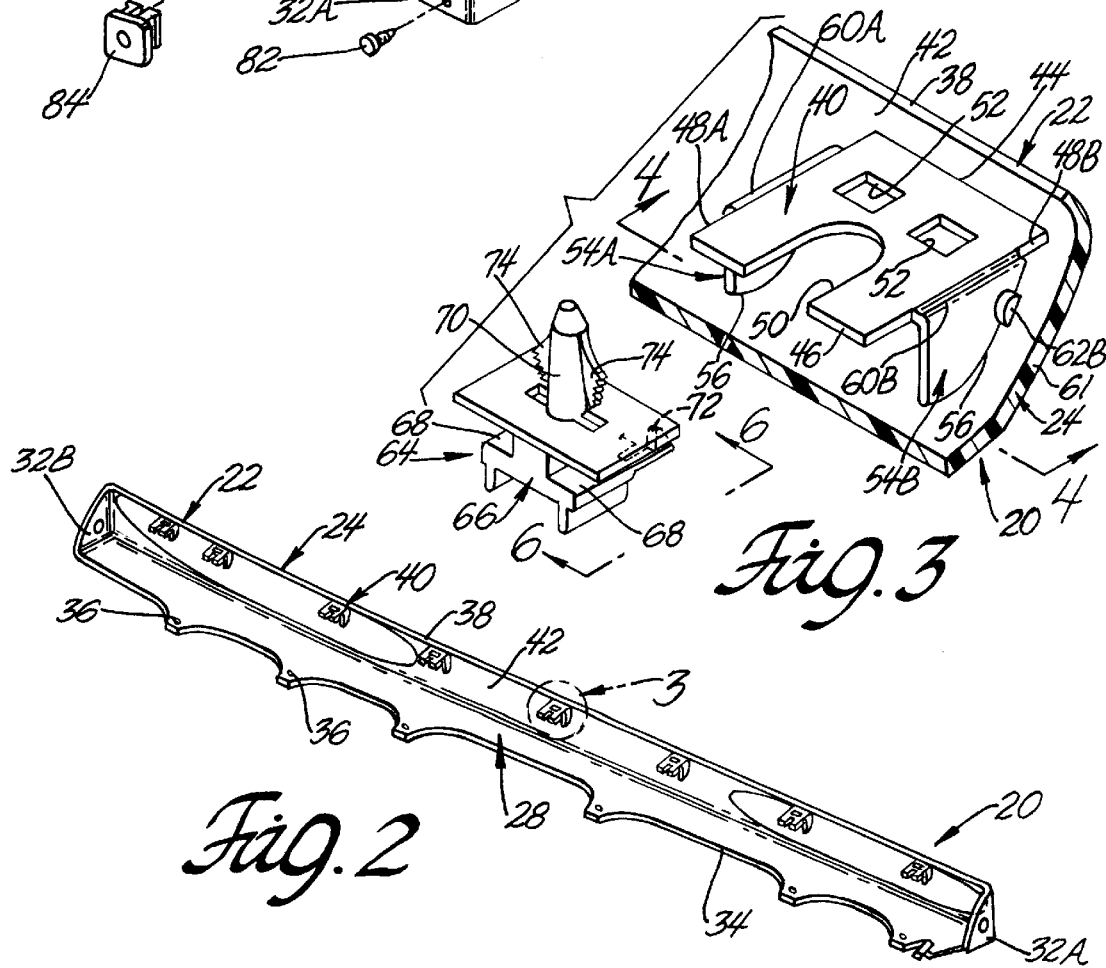

MOTOR VEHICLE TRIM PANEL ASSEMBLY AND METHOD

This invention relates to a motor vehicle trim panel assembly and a method of making the same.

BACKGROUND OF THE INVENTION

A motor vehicle body typically includes a pair of longitudinal "rocker" panels where the vertical sides of the body intersect the horizontal floor of the body. For aesthetic purposes, the rocker panels are commonly covered or shrouded by a pair of trim panel assemblies each including a molded plastic trim panel having a facia portion shaped to fit over a vertical side of the rocker panel and a skirt portion shaped to fit over a horizontal bottom of the rocker panel. The trim panel is molded in a selected color with a plurality of integral L-shaped supports on an inside surface of the facia portion each including a platform facing the vertical side of the rocker panel and a strut perpendicular to the platform at an outboard edge of the platform. A push-in fastener of the trim panel assembly is mounted in a slot in the platform of each of the L-shaped supports. Force applied to an outer surface of the facia portion at each of the L-shaped supports thrusts the push-in fastener thereon into a socket in the vertical side of the rocker panel to secure the facia portion of the trim panel to the rocker panel without the push-in fasteners being externally visible. The strut of each of the L-shaped supports transfers or reacts to the facia portion a fraction of the thrust applied to the corresponding push-in fastener to prevent flexure of the platform of the L-shaped support. In order to mold the trim panel with such integral L-shaped supports, a relatively complex mold is required including a plurality of sliding cores which must be withdrawn from inside of the L-shaped supports in order for the trim panel to be extracted from the mold. Such sliding cores increase the cost of the molds and are responsible for visible undulations in the outer surface of the facia portion of the trim panel attributable to relatively more rapid curing of the plastic melt which contacts the sliding cores. A trim panel assembly and method according to this invention are improvements over trim assemblies having such molded plastic trim panels with integral L-shaped supports and methods of making the same.

SUMMARY OF THE INVENTION

This invention is a new and improved trim panel assembly and method of making the same including a molded plastic trim panel having a facia portion shaped to fit over the body panel, an integral skirt portion, a plurality of flat cantilever platforms on an inside surface of the facia portion facing the body panel, and a plurality of pairs of raised bosses on the inside surface of the facia portion below the platforms. Each platform has a pair of side panels attached thereto by integral "living" hinges. A push-in fastener of the trim panel assembly is supported in a slot in each platform. The side panels are folded down and snapped behind the raised bosses which retain the side panels in active positions defining struts or braces between the platform and the inside surface of the facia portion. Force applied to an outside surface of the facia portion at each of the platforms thrusts the push-in fastener thereon into a socket in the body panel to secure the facia portion of the trim panel to the body panel without the push-in fasteners being externally visible. The struts transfer or react to the facia portion a fraction of the thrust applied to the corresponding push-in fastener to prevent flexure of the platform. Because each platform is integral with the facia portion along only one edge of the platform, the plastic trim panel can be extracted from its mold without resort to sliding cores. Manufacturing expense and surface undulations attributable to such sliding cores are thus avoided.

BRIEF DESCRIPTION OF THE DRAWINGS

FIG. 1 is a perspective view of a trim panel assembly according to this invention;

FIG. 2 is a perspective view of the trim panel assembly according to this invention taken generally in the direction indicated by arrow "2" in FIG. 1;

FIG. 3 is an enlarged, exploded perspective view of the portion of FIG. 2 identified by reference circle "3" in FIG. 2;

DESCRIPTION OF THE PREFERRED EMBODIMENT

Figure 4:
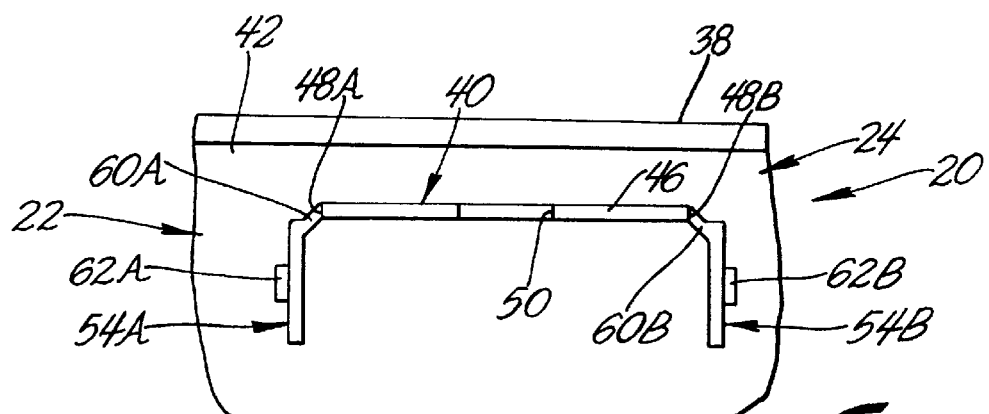
FIG. 4 is a view taken generally along the plane indicated by lines 4—4 in FIG. 3.
Figure 5:
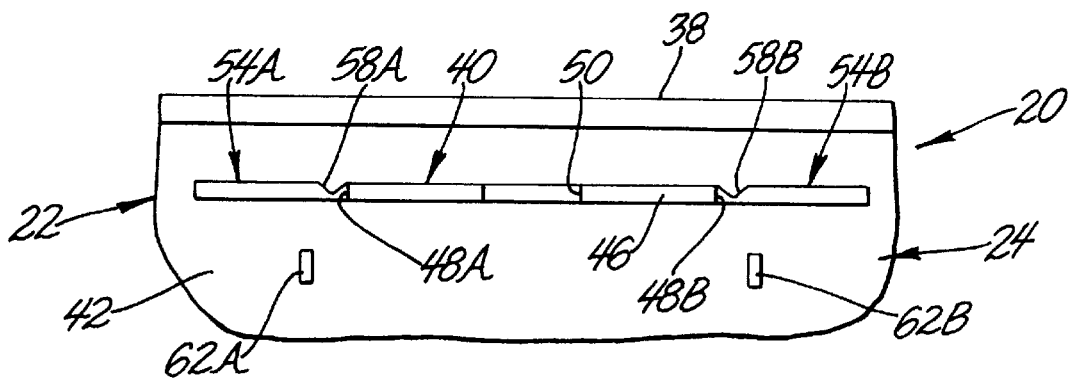
FIG. 5 is similar to FIG. 4 showing structural elements of the trim panel assembly according to this invention in different relative positions.

Referring to FIG. 1, a fragmentarily illustrated motor vehicle body 10 includes a front fender 12, a rear quarter panel 14, a pair of doors 16A,16B, and a longitudinal "rocker" panel 18 below the doors between the front fender and the rear quarter panel. The rocker panel 18 is covered or shrouded by a trim panel assembly 20 according to this invention.

The trim panel assembly 20 includes a plastic trim panel 22 molded in one piece in any selected color. The trim panel 22 includes an arched facia portion 24 shaped to match the contour of a vertical side 26 of the rocker panel 18, an integral skirt portion 28 matching the contour of a bottom 30 of the rocker panel, and a pair of integral end flanges 32A,32B. The skirt portion 28 terminates at a scalloped edge 34 having a plurality of perforations 36 therein which may be reinforced by a corresponding plurality of metal clips, not shown. The facia portion 24 terminates at an upper edge 38 of the trim panel.

As seen best in FIGS. 2–5, the plastic trim panel 22 further includes a plurality of integral, flat cantilever platforms 40 on an inside surface 42 of the facia portion below the upper edge 38 thereof facing the vertical side 26 of the rocker panel. Each platform 40 has a longitudinal inner edge 44 where the platform merges with the inside surface of the facia portion, a longitudinal outer edge 46 parallel to the inner edge, and a pair of side edges 48A,48B perpendicular to the inner and the outer edges. Each platform 40 is interrupted by a slot 50 perpendicular to and open through the outer edge 46 and by a pair of windows 52 on opposite sides of the slot.

Each platform 40 has a pair of integral side panels 54A,54B. Each side panel 54A,54B extends longitudinally beyond the corresponding one of the side edges 48A,48B of the platform in the plane thereof, FIG. 5, and includes an arched edge 56 matching the contour of the inside surface 42 of the facia portion 24. The side panels 54A,54B are separated from the platform 40 by respective ones of a pair of V-shaped grooves 58A,58B at the side edges of the platform which constitute respective ones of a pair of integral or "living" hinges 60A,60B at which the side panels are pivotable relative to the platform against restoring forces attributable to the natural or residual resilience of the plastic from which the trim panel 22 is molded. Because each platform 40 is integral with the facia portion along only one edge of the platform and the side panels are wholly separate from the facia portion, the plastic trim panel can be molded in one piece and extracted from its mold without resort to sliding cores. Manufacturing expense and surface undulations in an outside surface 61 of the facia portion attributable to such sliding cores are thus avoided.

The inside surface 42 of the facia portion of the trim panel is further interrupted by a plurality of pairs of raised bosses 62A,62B generally below the living hinges 60A,60B. The side panels 54A,54B on each platform 40 are manually folded down at the living hinges against the aforesaid restoring force from their flat, molded positions, FIG. 5, in the plane of the platform to active positions, FIGS. 3–4, perpendicular to the platform. Concurrently, the raised bosses 62A,62B cam the arched edges 56 of the side panels away from the inside surface of the facia portion to resiliently flex the platform 40 in cantilever beam bending. When the side panels attain their active positions, the natural resilience of the platform snaps the side panels behind the raised bosses with their arched edges bearing flush against the inside surface of the facia portion, FIGS. 3–4. At the same time, the aforesaid restoring force on each of the side panels biases the side panels against the raised bosses which thus maintain the side panels in their active positions.

Figure 6:
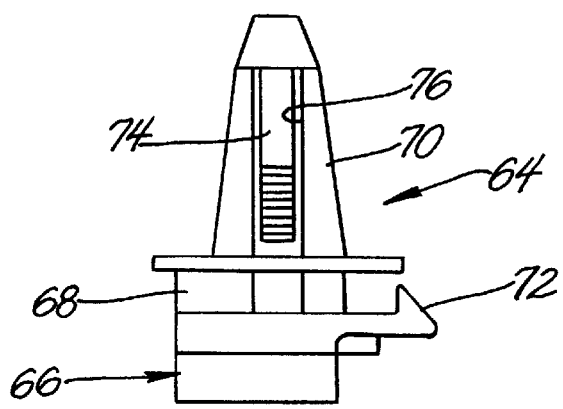
FIG. 6 is a view taken generally along the plane indicated by lines 6—6 in FIG. 3.

As seen best in FIGS. 3 and 6, respective ones of a plurality of push-in fasteners 64 of the trim panel assembly 20 are mounted on the platforms 40. Each push-in fastener 64 includes a lower body 66 having a pair of channels 68 which slidably receive the sides of the slot 50 in the platform and a post-shaped upper body 70 perpendicular to the lower body. The lower body 66 further includes a pair of hooks 72 which snap into respective ones of the windows 52 in the platform to prevent dislodgment of the push-in fastener from the slot 50. The upper body 70 has a pair of tangs 74 thereon each resiliently flexible into a cross slot 76, FIG. 6, in the upper body.

With the push-in fasteners 64 mounted on the platforms 40 as described above, the trim panel assembly 20 is secured to the vehicle body 10 over the rocker panel 18 as follows. The plastic trim panel 22 is positioned over the rocker panel with the facia portion 24 facing the vertical side 26 of the rocker panel and the skirt portion 28 facing the bottom 30 of the rocker panel. The facia portion is secured to the vertical side of the rocker panel by aligning the push-in fasteners 64 with respective ones of a plurality of sockets 78 in the vertical side of the rocker panel and then applying force on the outside surface 61 of the facia portion generally at each of the platforms 40. The applied force thrusts the upper bodies 70 of the push-in fasteners into the sockets 78 which flex the tangs 74 into the cross slots in the upper bodies. At the same time, the side panels 54A,54B, in their active positions, constitute struts or braces which transfer or react to the facia portion a fraction of the force applied to the corresponding push-in fastener to prevent flexure of the platform 40. When the facia portion attains an installed position, not shown, over the rocker panel, the tangs 74 snap out of the upper body of each push-in fastener and secure the facia portion to the rocker panel by preventing dislodgment of the push-in fasteners from the sockets without the push-in fasteners being externally visible.

The skirt portion 28 of the plastic trim panel 22 is secured to the bottom 30 of the rocker panel by a plurality of fasteners, not shown, inserted through the perforations 36 into respective ones of a plurality of sockets, not shown, in the bottom of the rocker panel. The flanges 32A,32B on the ends of the plastic trim panel 22 are secured by respective ones a pair of fasteners 82 inserted through apertures in the flanges into respective ones of a pair of plastic sockets 84 mounted on the ends of the rocker panel.

Having thus described the invention, what is claimed is:

1. A trim panel assembly for covering a motor vehicle body panel comprising:

a molded plastic trim panel including a facia portion having an inside surface and an outside surface, a flat cantilever platform integral with the facia portion on the inside surface thereof adapted to face the vehicle body panel having a pair of side edges, a pair of flat side panels each having an arched edge matching the contour of the inside surface of the facia portion, a pair of living hinges integral with the flat cantilever platform and with respective ones of the pair of flat side panels supporting each of the pair of flat side panels on the flat cantilever platform at respective ones of the pair of side edges thereof for pivotal movement against a resilient restoring force of each of the pair of living hinges from a first position in the plane of the flat cantilever platform to a second position perpendicular to the flat cantilever platform with the arched edge thereof bearing against the inside surface of the facia portion, a retainer means operable to retain each of the pair of flat side panels in the second position thereof, a push-in fastener means, and an attachment means operable to attach the push-in fastener means to the flat cantilever platform, each of the pair of flat side panels in the second position thereof constituting a strut between the flat cantilever platform and the inside surface of the facia portion operable to prevent flexure of the flat cantilever platform when the push-in fastener means is thrust into a socket in the vehicle body panel by a force on the outside surface of the facia portion.

2. The trim panel assembly for covering a motor vehicle body panel recited in claim 1 wherein the retainer means comprises:

a pair of raised bosses on the inside surface of the facia portion below respective ones of the pair of living hinges each blocking pivotal movement of a corresponding one of the flat side panels from the second position thereof toward the first position thereof by the resilient restoring force of the corresponding one of the pair of integral living hinges.

3. The trim panel assembly for covering a motor vehicle body panel recited in claim 2 wherein the attachment means operable to attach the push-in fastener means to the flat cantilever platform comprises:

a slot in the flat cantilever platform having an open end, a pair of windows in the flat cantilever platform on opposite sides of the slot therein, a lower body on the push-in fastener means having a pair of channels therein slidably receiving respective ones of a pair of opposite edges of the slot in the flat cantilever platform and cooperating therewith in preventing dislodgment of the push-in fastener means from the slot in the flat cantilever platform perpendicular to the flat cantilever platform, and a pair of hooks on the lower body on the push-in fastener means seated in respective ones of the pair of windows in the flat cantilever platform and cooperating therewith in preventing dislodgment of the push-in fastener means from the slot in the flat cantilever platform through the open end of the slot.

4. A method of making a trim panel assembly for covering a motor vehicle body panel comprising the steps of:

molding a one-piece plastic trim panel including
- a facia portion having an inside surface and an outside surface,
- a flat cantilever platform integral with the facia portion on the inside surface thereof having a pair of side edges,
- a pair of flat side panels each having an arched edge matching the contour of the inside surface of the facia portion, and
- a pair of living hinges integral with the flat cantilever platform and with respective ones of the pair of flat side panels supporting each of the pair of flat side panels on the flat cantilever platform at respective ones of the pair of side edges thereof for pivotal movement against a resilient restoring force of each of the pair of living hinges from a first position in the plane of the flat cantilever platform to a second position perpendicular to the flat cantilever platform with the arched edge thereof bearing against the inside surface of the facia portion, pivoting each of the pair of flat side panels from the first position thereof to the second position thereof so that each of the flat side panels constitutes a strut between the flat cantilever platform and the inside surface of the facia portion, retaining each of the pair of flat side panels in the second position thereof, and attaching a push-in fastener means to the flat cantilever platform.

5. The method of making a trim panel assembly for covering a motor vehicle body panel recited in claim 4 wherein the step of retaining each of the pair of flat side panels in the second position thereof comprises the step of:

forming on the inside surface of the facia portion a pair of raised bosses below respective ones of the pair of living hinges, and resiliently snapping each of the flat side panels over a corresponding one of the pair of raised bosses during pivotal movement of each of the pair of flat side panels from the first position thereof to the second position thereof so that each of the pair of raised bosses blocks return pivotal movement of a corresponding one of the flat side panels from the second position thereof toward the first position thereof by the resilient restoring force of the corresponding one of the pair of integral living hinges.

\* \* \* \* \*